(12) United States Patent
Clay et al.

(10) Patent No.: US 11,611,601 B1
(45) Date of Patent: Mar. 21, 2023

(54) EVENT PRESENTATION SYSTEM FOR HOSTING PANEL DISCUSSIONS WITH REMOTE AUDIENCE PARTICIPATION

(71) Applicant: Eventuall, Inc., Los Angeles, CA (US)

(72) Inventors: Scott Addison Clay, Los Angeles, CA (US); Michael Baret Potter, Weehawken, NJ (US)

(73) Assignee: Eventuall, Inc., Los Angeles, CA (US)

( * ) Notice: Subject to any disclaimer, the term of this patent is extended or adjusted under 35 U.S.C. 154(b) by 0 days.

(21) Appl. No.: 17/369,682

(22) Filed: Jul. 7, 2021

(51) Int. Cl.
*H04L 65/4038* (2022.01)
*H04L 65/1083* (2022.01)
*H04L 65/1069* (2022.01)

(52) U.S. Cl.
CPC ...... *H04L 65/4038* (2013.01); *H04L 65/1069* (2013.01); *H04L 65/1083* (2013.01)

(58) Field of Classification Search
None
See application file for complete search history.

(56) References Cited

U.S. PATENT DOCUMENTS

| | | | |
|---|---|---|---|
| 8,693,648 B1 | 4/2014 | Drugge et al. | |
| 9,148,627 B2 | 9/2015 | Anderson et al. | |
| 9,538,011 B1* | 1/2017 | Sherman | H04L 65/403 |
| 9,936,163 B1* | 4/2018 | Lubelsky | H04N 7/15 |
| 10,080,061 B1* | 9/2018 | Kirley | H04N 21/4852 |
| 10,693,669 B2 | 6/2020 | Dave et al. | |
| 10,771,743 B2* | 9/2020 | Kiraz | G06F 3/04847 |
| 2003/0026404 A1* | 2/2003 | Joyce | H04Q 3/0029 379/144.01 |
| 2008/0120101 A1* | 5/2008 | Johnson | G10L 15/22 704/E15.04 |
| 2010/0070554 A1* | 3/2010 | Richardson | H04L 67/306 709/202 |
| 2011/0081632 A1* | 4/2011 | Garg | G09B 19/00 434/118 |
| 2016/0021039 A1* | 1/2016 | Woo | H04L 51/226 715/752 |
| 2016/0048561 A1* | 2/2016 | Jones | G06F 16/285 707/722 |
| 2016/0188587 A1* | 6/2016 | Martin | G06F 16/134 707/734 |
| 2016/0241713 A1* | 8/2016 | Alm | G09B 19/00 |
| 2016/0308799 A1* | 10/2016 | Schubert | H04L 67/535 |
| 2018/0108266 A1* | 4/2018 | Stoner | G06Q 30/0203 |
| 2018/0139412 A1* | 5/2018 | Kiraz | G06F 16/951 |
| 2020/0090681 A1* | 3/2020 | Hu | A61B 5/4803 |
| 2021/0120053 A1* | 4/2021 | Shin | H04L 67/1068 |
| 2021/0304617 A1* | 9/2021 | Ahire | G06V 40/20 |
| 2021/0399911 A1* | 12/2021 | Jorasch | H04L 65/403 |
| 2021/0409882 A1* | 12/2021 | Metzar | H04R 3/04 |
| 2022/0011878 A1* | 1/2022 | Jorasch | A63F 13/235 |
| 2022/0014567 A1* | 1/2022 | Cao | H04L 65/1069 |
| 2022/0368791 A1* | 11/2022 | Huang | H04M 1/72406 |

* cited by examiner

*Primary Examiner* — Dhairya A Patel
(74) *Attorney, Agent, or Firm* — Jeffrey G. Sheldon; Cislo & Thomas LLP

(57) ABSTRACT

An online event presentation system where remotely located audience members may present questions to a panel of one or more remotely located guest speakers, moderated by one or more remotely located operators, is presented.

11 Claims, 14 Drawing Sheets

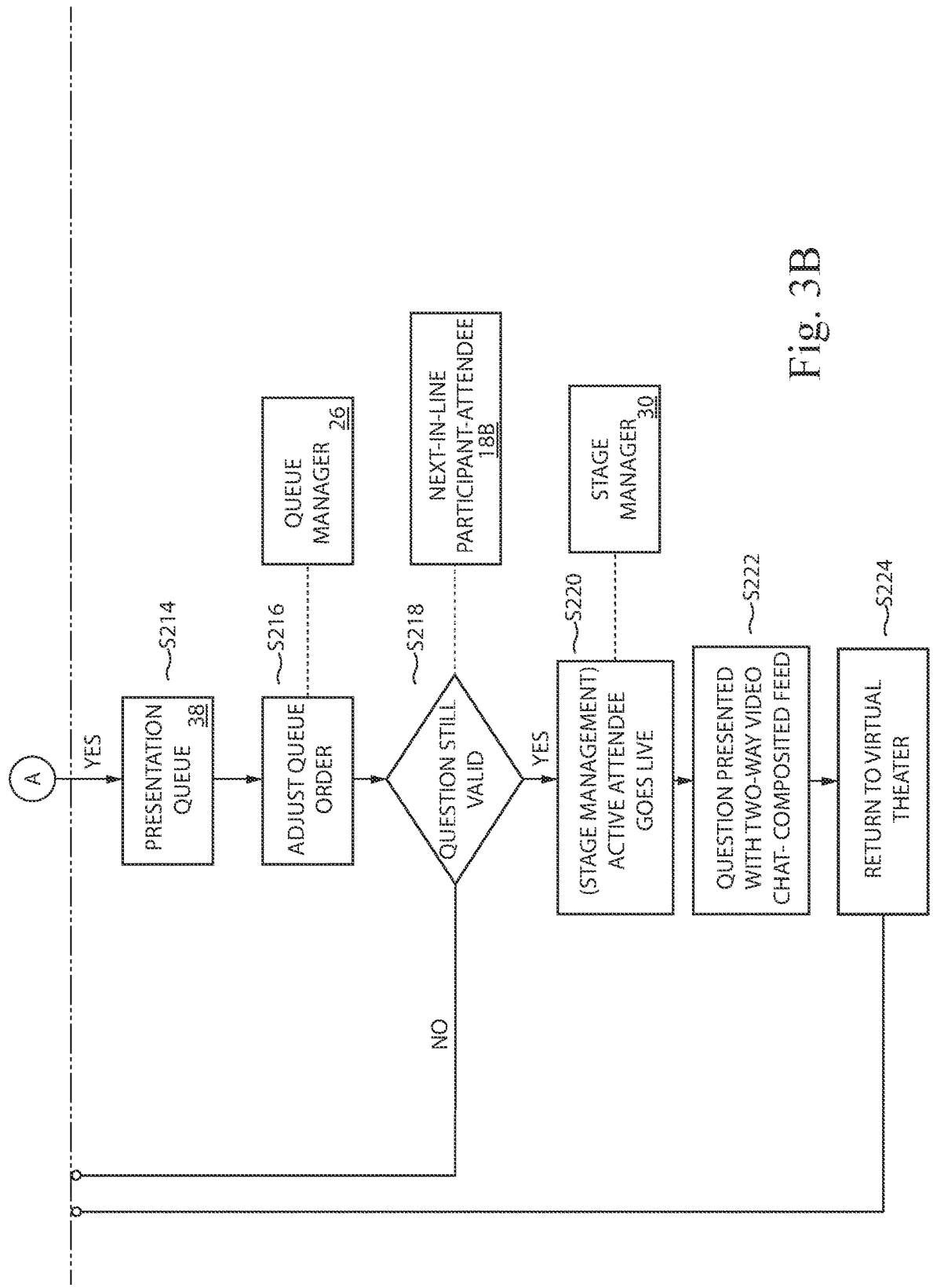

EVENT PRESENTATION SYSTEM FOR HOSTING PANEL DISCUSSIONS WITH REMOTE AUDIENCE PARTICIPATION

BACKGROUND OF THE INVENTION

Field of the Invention

The present invention relates generally to the field of event presentation and, more particularly, to moderated, online event presentation where audience members may engage in question and answer sessions with guest speakers.

Background of the Invention

Members of the general public often have an interest in interacting with high-profile individuals or persons of interest. Such high-profile individuals typically include individuals active in the fields of business, media, or politics, as well as professional and amateur sports and entertainment, among others. To satisfy the public's interest in such individuals, public speaking events, television and radio talk shows and exposes in television, radio and print media are regularly promoted to the public. In recent years, the internet has become another option for delivering such content to the public. Public speaking events are one of the primary vehicles for a high-profile individual to address the public. Although such events allow audience members to watch or listen to a high-profile individual regarding specific subject matter presented by the high-profile individual, audience members have, depending upon the format, little or no ability to meaningfully interact with the high-profile individual.

In presentations, whether delivered via television, radio or print media, an audience member lacks any ability to interact with the high-profile individual. Television talk shows and some public speaking events partially solve this problem, in that selected members of a relatively small studio audience may have an opportunity to present questions to the high-profile individual. The general public however, whether attending a public speaking event or a television talk show, has no ability to interact with the high-profile individual.

Of traditional media, "call-in" radio talk shows may come closest to solving the interaction problem as the entire audience of listeners is able to call-in and, potentially, have an opportunity to present questions to one or more high-profile guests. Radio talk shows have the drawback however, of being limited by the fact that they are audio only and therefore, a listener cannot see the high profile guest. Being able to see a person's mannerisms and reactions is a large part of social interaction. In-person meetings and conferences also give participants or attendees the ability to present questions of a high-profile individual. i.e. the meeting organizer or a conference presenter. Such events however, being conducted in person, are generally limited in size and do not allow for participation by anyone remote from the meeting room or conference hall.

What is needed therefore is a new or improved system where high-profile guest speakers may interact more directly with an audience, i.e. where members of the audience have the opportunity to present questions to the high-profile speaker and interact directly with them. Ideally, such a new system would allow both audio and visual communication and would allow remotely located audience members, i.e. audience members not physically located in the same place as the high-profile speaker, to present questions to the speaker, as well as provide a means for moderating such interactions.

SUMMARY OF THE INVENTION

The event presentation system or system for sharing events over a network of the present invention improves upon the prior art by providing an online system allowing for both audio and visual communication between audience members and guest speakers, i.e. high-profile individuals, while providing a means for moderating such interactions. In the event presentation system, event operators, i.e. a vetting manager, queue manager and a stage manager, utilizing software applications, host a panel discussion which is streamed or broadcast live over the internet to attendees or audience members, who access the system via a software application. Attendees, i.e. anyone who has logged in to the system to view the live-streamed broadcast, may also request to participate in a real-time, video question and answer session with a panel member or members by submitting questions to the panel members. Panel members will typically comprise high-profile guest speakers such as actors, sports figures, industry leaders, or other persons of public interest). Each attendee, event operator and panel member may be remotely located.

The system requires each attendee to participate in a technical vetting process of the attendee's audio/visual hardware and software. Technical vetting is conducted by a software module. Once an attendee has passed technical vetting, the attendee may elect to enter a virtual "theater." If more than one production is available, each attendee is presented with a choice of virtual theaters to enter. In the virtual theater, each attendee can view the video feed of the panel members.

Any attendee who passes technical vetting and has entered a virtual theater, may submit a request to present a question, where the question will be presented live by the attendee to one or more of the panel members. Upon submission, the attendee is placed in a vetting queue. Prior to presentation to a panel member, each attendee's question is vetted for subject matter content by a vetting manager, who, using a software module, either approves, denies or cancels, the question. If an attendee's question is approved, the attendee is placed in a presentation queue and designated a participant-attendee. If the attendee's question is denied, but is considered "fixable." the attendee is provided with an opportunity to revise his or her question. If the question is considered "unfixable," the attendee is returned to the virtual theater.

Generally, participant-attendees are ordered in the presentation queue on a first-in-time basis. A queue manager, utilizing a software module, may, however, subsequently modify the order of participant-attendees in the presentation queue. That is, the queue manager has the ability to move a participant-attendee ahead of others in the presentation queue, which he may do based upon his impression of the likely collective interest of the other attendees in the virtual theater in the question to be presented. As the presentation queue progresses, each participant-attendee becomes the next-in-line-to-go-live participant-attendee, i.e. the next participant-attendee to be presented live to the panel members.

Prior to being presented to the panel members, a system operator checks to determine whether the next-in-line-to-go-live participant-attendee still desires to present his or her question. As participant-attendees must wait their turn in the queue before presenting their question, it is possible that a previous participant-attendee may have asked the same question, or the subject matter of the next-in-line-to-go-live participant-attendee's question may have otherwise been addressed by the panel members. In such instances, the next-in-line-to-go-live participant-attendee may elect not to present their question, in which case the participant-attendee is removed by the system from the presentation queue and returned to the virtual theater.

When a participant-attendee in the presentation queue has moved into the next-in-line-to-go-live position in the queue, i.e. is ready to go live, a stage manager, using a software module, designates the participant-attendee as the active attendee and composites or swaps the video feed of the active attendee into the virtual stage or discussion room where the active attendee can then present his or her question live to the panel members and engage in a video question and answer session. That is, the stage manager composites the active attendee's video feed with the video feed of the panel members, which is displayed in the virtual theater.

When the live question and answer session concludes, the stage manager removes the active attendee's video feed from the stage. i.e. removes it from the composite video feed displayed in the virtual theater. The stage manager also changes the active attendee's status back to attendee and the attendee is then returned to the virtual theater, where the attendee may request to present another question if desired.

The above and other advantages of the system for hosting panel discussions with remote audience participation of the present invention will be described in more detail below.

BRIEF DESCRIPTION OF THE DRAWINGS

FIG. 3B is a continuation of the flow chart depicting of FIG. 3A.

DETAILED DESCRIPTION OF THE PREFERRED EMBODIMENTS

The present invention will now be described more fully hereinafter with reference to the accompanying drawings, in which preferred embodiments of the invention are shown. The invention may, however, be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

The event presentation system or system for sharing events over a network 10 of the present invention is an internet based system that uses software applications resident on computing devices or accessible by means of computing devices, to host online events 44 which are typically in the form of panel discussions between remotely located guest speakers or panel members and remotely located attendees. The panel discussions are managed by event operators, i.e. a vetting manager, queue manager and stage manager, who also use software applications resident on or accessible from computing devices, to produce and moderate the panel discussions or events.

Computing devices are generally defined herein as devices containing at least one processor, memory device, visual display device, microphone, text input device and operating system capable of running software applications. Software applications are defined as instruction sets or code, storable on a memory device and executable by a processor. The meaning of the terms "computing devices" and "Software applications" and representative examples of such devices and applications are further discussed infra in this disclosure.

As used herein, the term "video feed" shall be presumed to include both audio and video components of an audio-visual feed. As used herein, the term "video chat" shall include all forms of video chat functions including two-way and multi-way video chat. As used herein, the term "audio-visual hardware" shall be defined as including a microphone, a speaker and a video camera.

Figure 1:
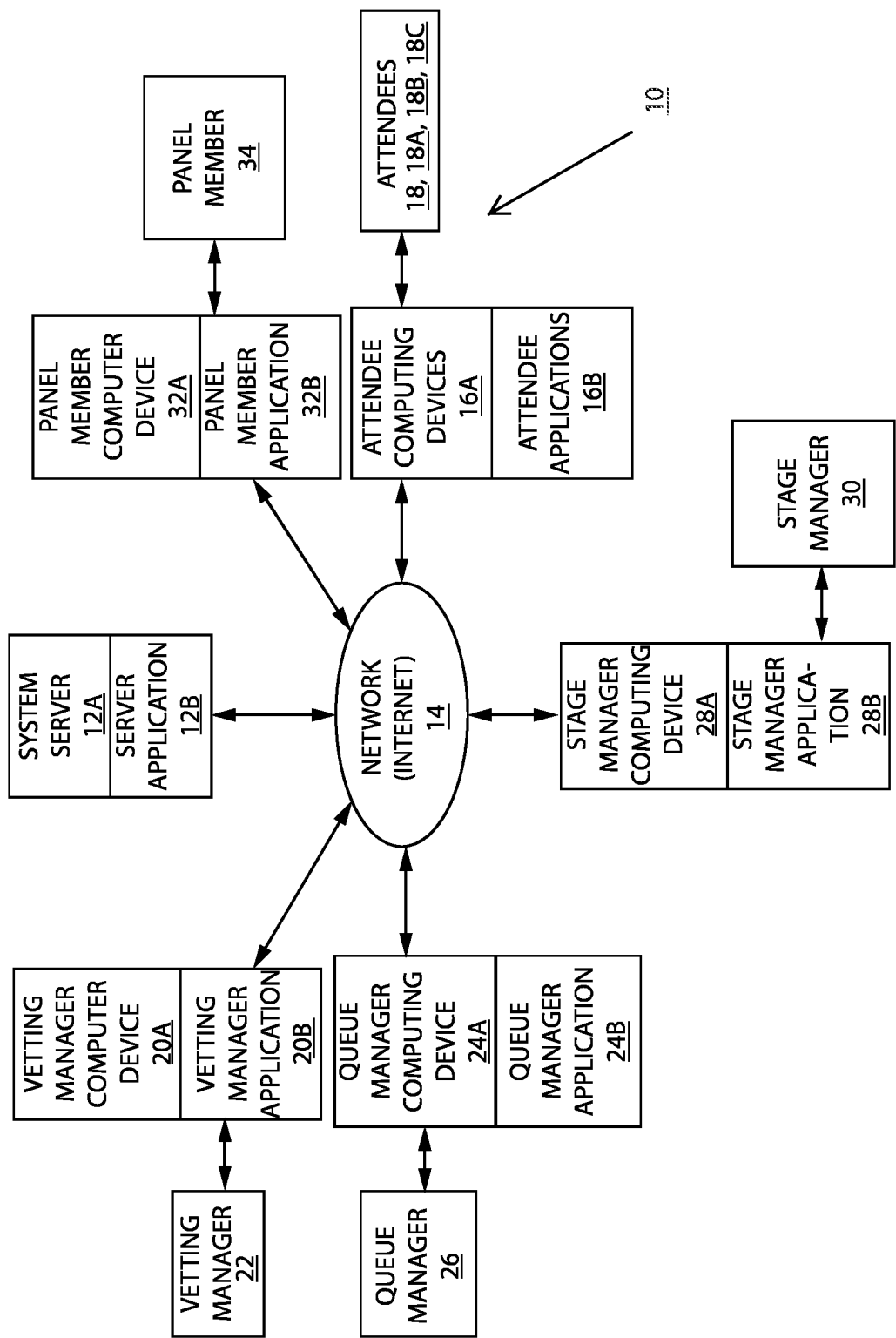
FIG. 1 is a high level block diagram illustrating an exemplary embodiment of the event presentation system for hosting of panel discussions with remote audience participation of the present invention.
Figure 1A:
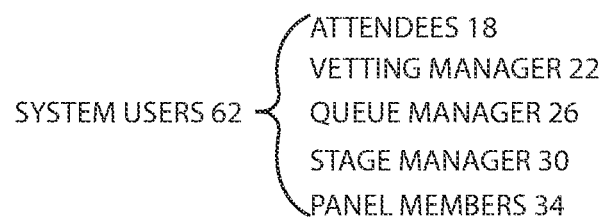
FIG. 1A identifies the users of the event presentation system of the present invention.
Figure 1B:
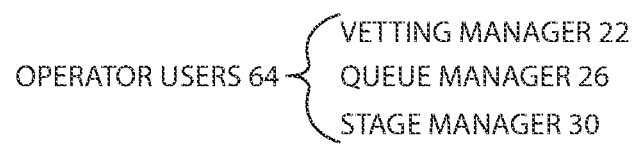
FIG. 1B identifies the operator users of the event presentation system of the present invention.

With reference to FIGS. 1, 1A and 1B, the event presentation system 10 of the present invention includes a system server 12A, a plurality of attendee or audience member computing devices 16A, a vetting manager computing device 20A, a queue manager computing device 24A, a stage manager computing device 28A and, one or more panel member or speaker computing devices 32A. The system server 12A and the computing devices 16A. 20A. 24A, 28A and 32A are coupled to each other by means of a network 14, which in the exemplary embodiment is the Internet.

Resident on the system server 12A is a system application 12B, comprising software routines and instructions to operate the event presentation system 10. Resident on each of the plurality of attendee computing devices 16A are attendee applications 16B, which comprise software routines and instructions to allow attendees 18 to interact with the event presentation system 10. Resident on each of the one or more panel member computing devices 32A are panel member applications 32B, which comprise software routines and instructions to allow each of one or more panel members 34 to interact with the event presentation system 10. Resident on each of the vetting, queue, and stage manager computing devices 20A, 24A and 28A, are vetting, queue, and stage manager applications 20A, 24B and 28B, respectively, which comprise software routines and instructions to allow a vetting manager 22, queue manager 26 and stage manager 30 to manage and moderate event procedure in the event presentation system 10.

As referenced above, a number of users participate in the event presentation system 10. The roles for panel members 34, attendees 18 who may elect to become participant-attendees 18A, and the vetting manager 22, queue manager 26 and stage manager 30, are generally defined below.

Panel members 34 are high-profile individuals such as actors, sports figures, politicians, industry leaders, or other persons of public interest.

Attendees 18 are any individuals who access the event presentation system 10 in order to watch an event.

Participant-attendees 18A are any attendees 18 who desire to participate in a live video question and answer session 50 with a panel member 34 by submitting a question to be presented 36 to the panel members 34 and whose question is first approved by the vetting manager 22.

The vetting manager 22 is an operator user who pre-screens questions to be presented 36 to panel members by attendees for acceptable content.

The queue manager 26 is an operator user who manages a presentation queue 38 (see FIG. 2) of participant-attendees 18A. The presentation queue 38 is typically filled with participant-attendees 18A on a first-in-time basis. The queue manager however has the ability and discretion to adjust queue order and may also remove participant-attendees and terminate a participant-attendee's video and audio feed.

The "stage manager 30 is an operator user who has the ability to grant and revoke attendee access to panel members 34 appearing in a virtual theater 42. The stage manager 30 also composites the active-attendee's video feed 44 with the video feed of the panel members 46, which is displayed in the virtual theater 42 as a composited video feed 48.

Features of the Attendee and Operator User Applications

Attendee Application

Figure 2A:
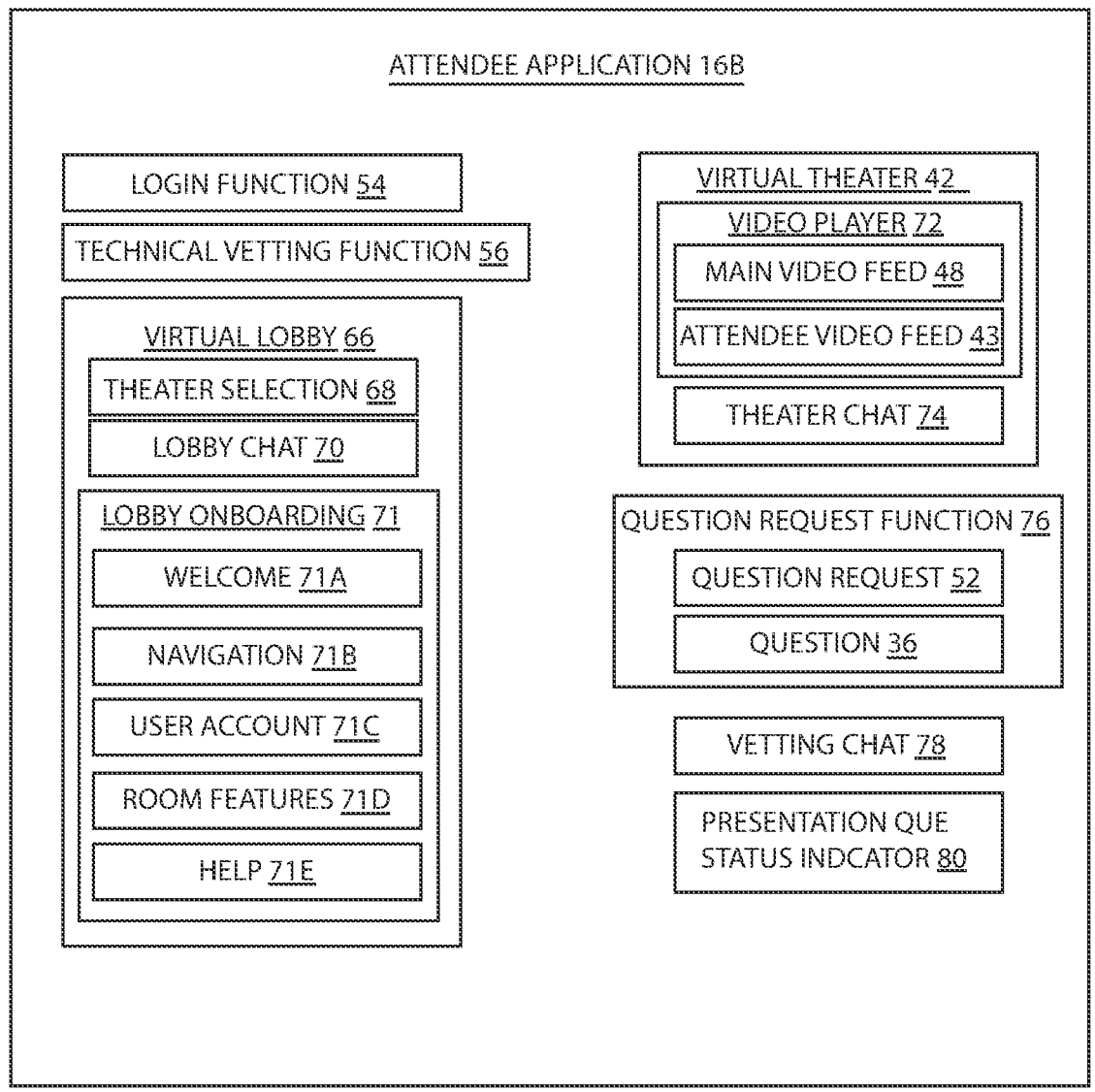
FIG. 2A is an exemplary block diagram depicting the features of the attendee application.

With reference to FIGS. 1-1B and with particular reference to FIG. 2A, an exemplary block diagram depicting the features of the attendee application 16B, is shown. Attendees 18 are users of the event presentation system 10 who access the system for the purpose of enjoying the events presented 11 and who have the option, of submitting question requests 52, via the vetting process, for the purpose of subsequently presenting live, questions 36 to the panel members 34. The attendee application 16B contains a login function 54, a technical vetting function 56, a virtual lobby 66, a virtual theater 42, a virtual theater selection function 68 and a lobby chat function 70.

The login function 54 allows attendees 18 to access the attendee application 16B and thus, the event presentation system 10. Typically, to access the application 16B, an attendee 18 must create an account by entering an account name, which may be an email address, and creating a password to be associated with attendee's particular user name. Each subsequent login by each attendee requires the particular attendee to reenter his or her previously created user name and password.

The technical vetting function 56, automatically conducts technical vetting of an attendee's computing device 16A. That is, the technical vetting function 56 verifies via interaction with each attendee 18, that the microphone and video camera of the attendee's computing device 16A is operational.

The virtual lobby 66 includes a lobby onboarding function 71 that will typically include a welcome function 71A, a navigation function 71B, a user account function 71D and a help function 71E. The lobby onboarding function 71 serves to familiarize attendees 18 with how to navigate the virtual lobby 66, the features of the virtual lobby 66, the virtual theaters 42, how to access and modify their account settings, and how to access and use the virtual theaters 42.

The theater selection function 68 allows attendees to select a particular virtual theater that is presenting an event 11 in which they are interested and the lobby chat function 70, which allows each attendee 18 to chat with the other attendees in the virtual lobby 66.

With continued reference to FIGS. 1-2A, the virtual theater 42 includes a video player module 72 which allows an attendee 18 to watch a main or composite video feed 48 and the attendees own video feed 43. The main video feed 48 comprises a panel member's video feed 46 (see FIG. 2E) and, typically, an active attendee's video feed 43 (see FIG. 2D) which is composited with the panel member's video feed 46. The virtual theater 66 also includes a theater chat function 74, which allows an attendee 18 to chat with other attendees within the virtual theater 42. Further included within the attendee application 16b is a question request function 76 and a vetting chat function 78.

The question request function 76 allows an attendee 18 to submit a question request 52 to the vetting manager 22, where the attendee 18 seeks permission to present a question 36 to the panel member 34. The vetting chat function 78 allows the vetting manager 22 to conduct a video chat with the attendee 18. The vetting chat function 78 may also be used to provide interview support for a participant-attendee 18A, while he or she waits to present his or her question 36 to the panel member 34.

The attendee application 16B, further includes a presentation queue status indicator 80 that informs a participant-attendee 18A as to where the attendee is in a presentation queue 38. The presentation queue status indicator 80 further uses audible and visual indicators to inform participant-attendees 18A as to when they are a next-in-line-to-go-live participant-attendee 18B.

Vetting Manager Application

Figure 2B:
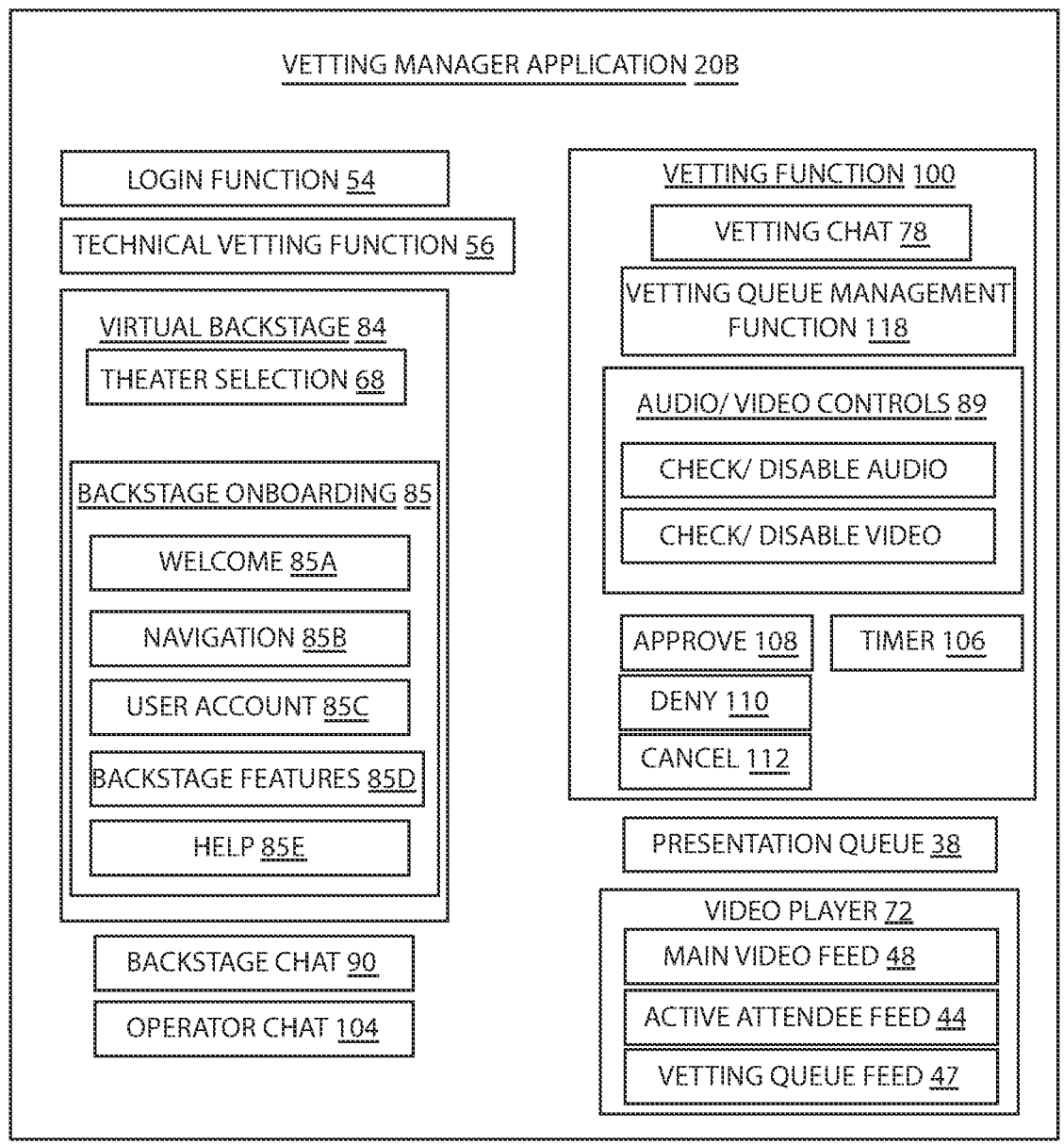
FIG. 2B is an exemplary block diagram depicting the features of the vetting manager application.

With reference to FIGS. 1-2A, and with particular reference to FIG. 2B, an exemplary block diagram depicting the features of the vetting manager application 20B, is shown. The vetting manager 22 is an operator user who is principally responsible for vetting the content of questions 36 to be presented in response to attendee question requests 52. The vetting manager application 20B includes the login function 54, the technical vetting function 56, a virtual backstage 84, a vetting function or vetting application main panel 100, a video player 72 and a backstage chat function 90 and an operator chat function 104.

The login function 54 allows a system user 62, in this case the vetting manager 22, to access to the event presentation system 10. The technical vetting function 56, automatically conducts technical vetting of the vetting manager's computing device 20A. The virtual backstage 84 is similar to the virtual lobby 66. The virtual backstage 84 includes a backstage onboarding function 85, which includes sub-functions such as a welcome function 85A, a navigation function 85B, a user account function 85D and a help function 85E. These functions serve to familiarize the vetting manager 22 with the features of, and how to navigate, the virtual backstage 84, as well as how access the vetting manager's account and how to access a particular virtual theaters 42 in which the vetting manager will conduct vetting for an event.

Upon the vetting manager 22 selecting a virtual theater 42 to vet, the vetting manager application 20B, takes the vetting manager 22 the vetting function or vetting application main panel 100.

The vetting application main panel or function 100, includes a vetting queue management function 120, a vetting chat function 78. The vetting queue management function 118 provides the vetting manager 22 with the ability to select individual attendees 18 from a vetting queue 82 (see FIG. 2F), where the vetting queue 82 comprises attendees who have submitted question requests 52, for questions 36 to be presented to panel members, where the questions 36 need to be vetted for suitable content.

The vetting chat function 78 allows the vetting manager 22 to conduct a video chat between himself and each attendee 18 in the vetting queue 82, where the vetting manager greets each attendee and previews for acceptable content the attendee's question 36 to be presented to the panel member 34.

Also included in the vetting function 100 are approval 108, denial 110 and cancel 112 functions for use in the vetting process. The approval function 108 and denial function 110 allow the vetting manager 22 to either approve or deny a question 36 to be presented. Approval of an attendee's question 36 to be presented causes the vetting manager application 20B to place the attendee 18 in the presentation queue 38, where the system designates the attendee as a participant-attendee 18A. Denial of a question 36 to be presented causes the application 20B to send the attendee 18 back to the vetting queue 82, where the attendee 18 may revise his or her question 36. If the vetting manager 22 elects to use the cancel function 112, which may occur from time to time when an attendee's question 36 is directed to entirely unacceptable subject matter, the application 20B causes that particular attendee 18 to be returned to the virtual theater 42, where the attendee may continue watching the event in progress 11.

The video player 72 of the vetting manager application 20B provides the vetting manager with main video feed 48, the active attendee's video feed 44 vetting queue video feed 47 which comprises the selectable video feeds of the attendees in the vetting queue.

The vetting manager application 20B also includes an operator chat function 104 which allows the vetting manager 22 to communicate with the queue manager 26 and the stage manager 30, a timer function 106 which provides feedback to the vetting manager 22 as to the time available to vet or process attendees 18, a camera and microphone control function 89 which allows the vetting manager 22 to check the quality of an attendee's audio and video feed and to selectively disable the video and audio feeds of particular attendees 18. The vetting manager application 20B also includes a backstage chat function 90, which allows the vetting manager to communicate with a panel member 34. The operator chat function 104 allows operator users 64 to communicate with each other without including the panel member.

Queue Manager Application

Figure 2C:
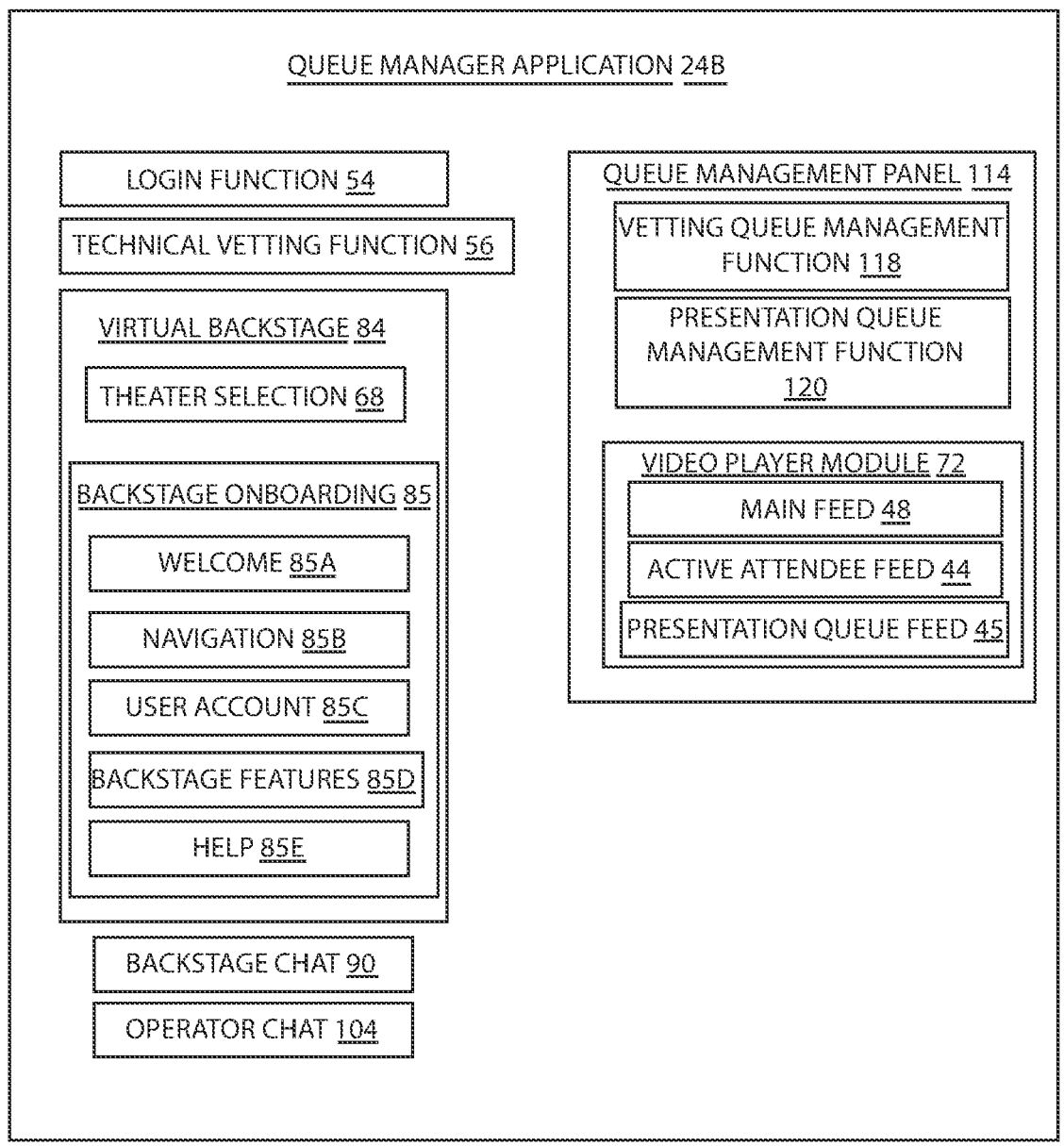
FIG. 2C is an exemplary an exemplary block diagram depicting the features of the queue manager application.

With reference to FIGS. 1-2B, and with particular reference to FIG. 2C, an exemplary block diagram depicting the features of the queue manager application 24B is shown. The queue manager 26 is an operator user who is principally responsible for managing the order of the participant-attendees 18B in the presentation queue 38. The queue manager application 24B contains the login function 54, the technical vetting function 56, the virtual backstage 84, and a queue management panel 114, as well as backstage chat 90 and operator chat 104. The login function 54, technical vetting function 56, the virtual backstage 84, backstage chat 90 and operator chat 104 components of the queue manager's application 24B are the same as those of the vetting manager application 20B and operate similarly.

The queue management panel 114 provides a presentation queue management function 120 that allows the queue manager 26 to arrange the order of participant-attendees 18A in the presentation queue 38 and to selectively remove participant-attendees 18A from presentation queue 38.

The queue management panel 114 also provides the queue manager with access to the vetting queue management function 118, which allows the queue manager 26 to conduct additional vetting of attendee questions 36 to be presented to panel members 34 or to take over vetting at times when the vetting manager 22 may be unavailable.

The video player 72 of queue manager application 24B, provides the queue manager 26 with the main or composite video feed 48; a presentation queue video feed 45 which the selectable video feeds of participant-attendees 18A who have been vetted and placed in the presentation queue 38; and, the vetting queue video feed 47 which comprises the selectable video feeds of attendees 18 who have submitted question requests 52, but who have not yet been vetted.

Stage Manager Application

Figure 2D:
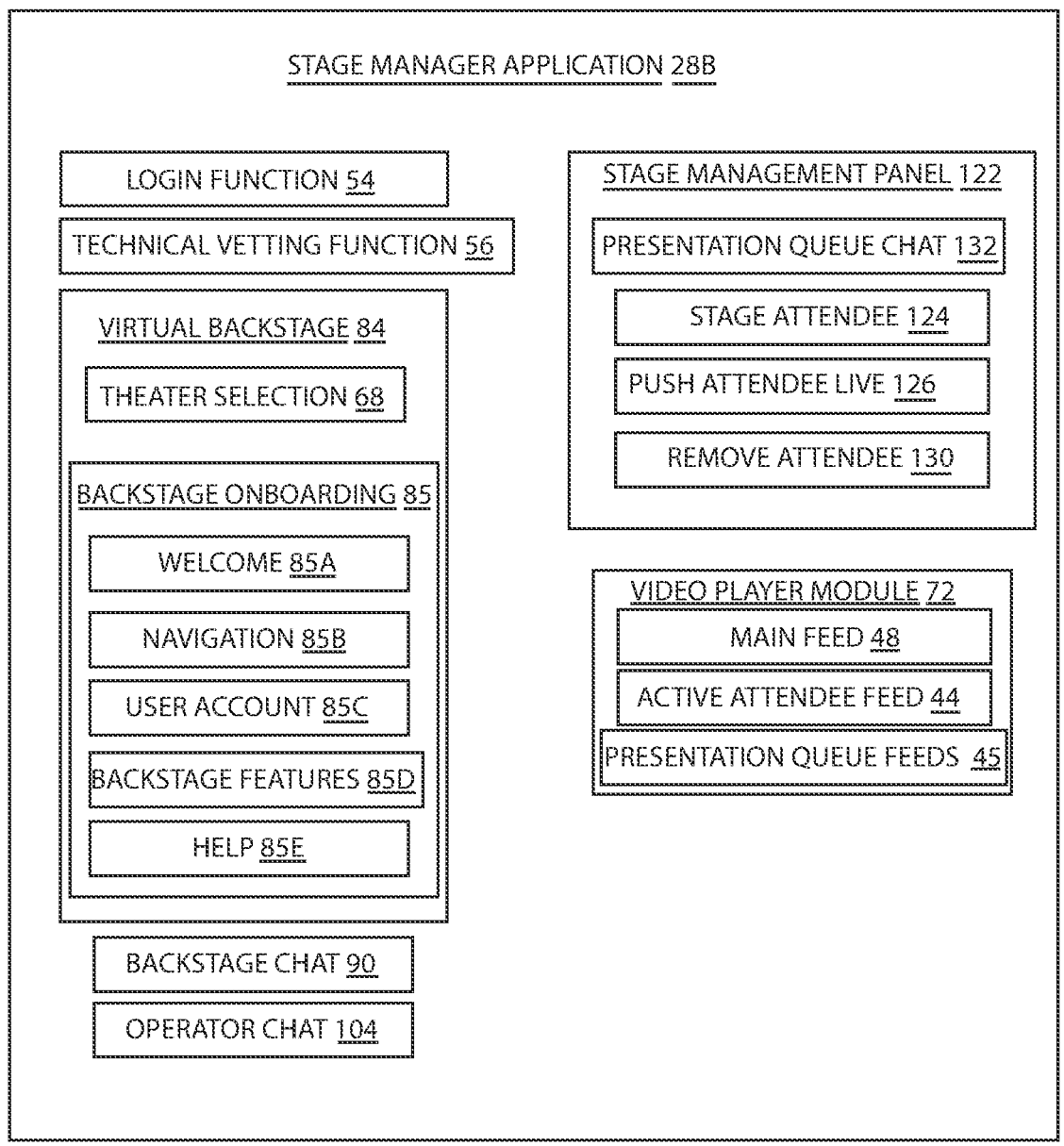
FIG. 2D is an exemplary an exemplary block diagram depicting the features of the stage manager application.

With reference to FIGS. 1-2C and, in particular to FIG. 2D, an exemplary block diagram depicting the features of the stage manager application 28B is shown. The stage manager 30 is an operator user who is principally responsible for compositing the video feed of the active attendee 44 with the video feed of the panel members 46 to create the main or composited video feed 48 displayed in the virtual theater 42.

The stage manager application 28B contains the login function 54, the technical vetting function 56, the virtual backstage 84, and a stage management panel 122, as well as backstage chat 90 and operator chat 104. The login function 54, technical vetting function 56, the virtual backstage 84, backstage chat 90 and operator chat 104 components of the stage manager's application 28B are the same as those of the vetting manager application 20B and queue manager application 24B and operate similarly.

The stage management panel 122 provides the stage manager 30 with a stage function 124, presentation queue chat 132, a push attendee live function 126 and an attendee removal function 130. The stage function 124 allows the stage manager 30 to designate a particular participant-attendee 18A as a staged attendee 18B, where the staged attendee 18B is the next-to-go-live attendee in the presentation queue 38.

After staging an attendee, the stage manager 30 will open a two way video chat with the staged attendee 18B to ensure that the staged attendee still desires to present his or her question 36 and otherwise ready to go live. The push attendee live function designates the stage attendee the active attendee 18C and presents the active attendee 18C to the panel member 34 and composites the active attendees video feed 44 with the video feed of the panel member 46 to create the main video feed 48. After being pushed live, the active attendee 18C presents his or her question 36 to the panel member 34 and a live question and answer session 50 subsequently takes place.

Upon conclusion of the live question and answer session 50, the attendee removal function 130 allows the stage manager 30 to end or decomposite the video feed of the active-attendee. After which the formerly active-attendee returned to the virtual theater 42, where the attendee is free to submit another question request 52 if he or she desires.

The video player 72 of stage manager application 28B, provides the stage manager 30 with the main or composite video feed 48; a presentation queue video feed 45 which the selectable video feeds of participant-attendees 18A who have been vetted and placed in the presentation queue 38; and, active attendee video feed 44.

Panel Member Application

Figure 2E:
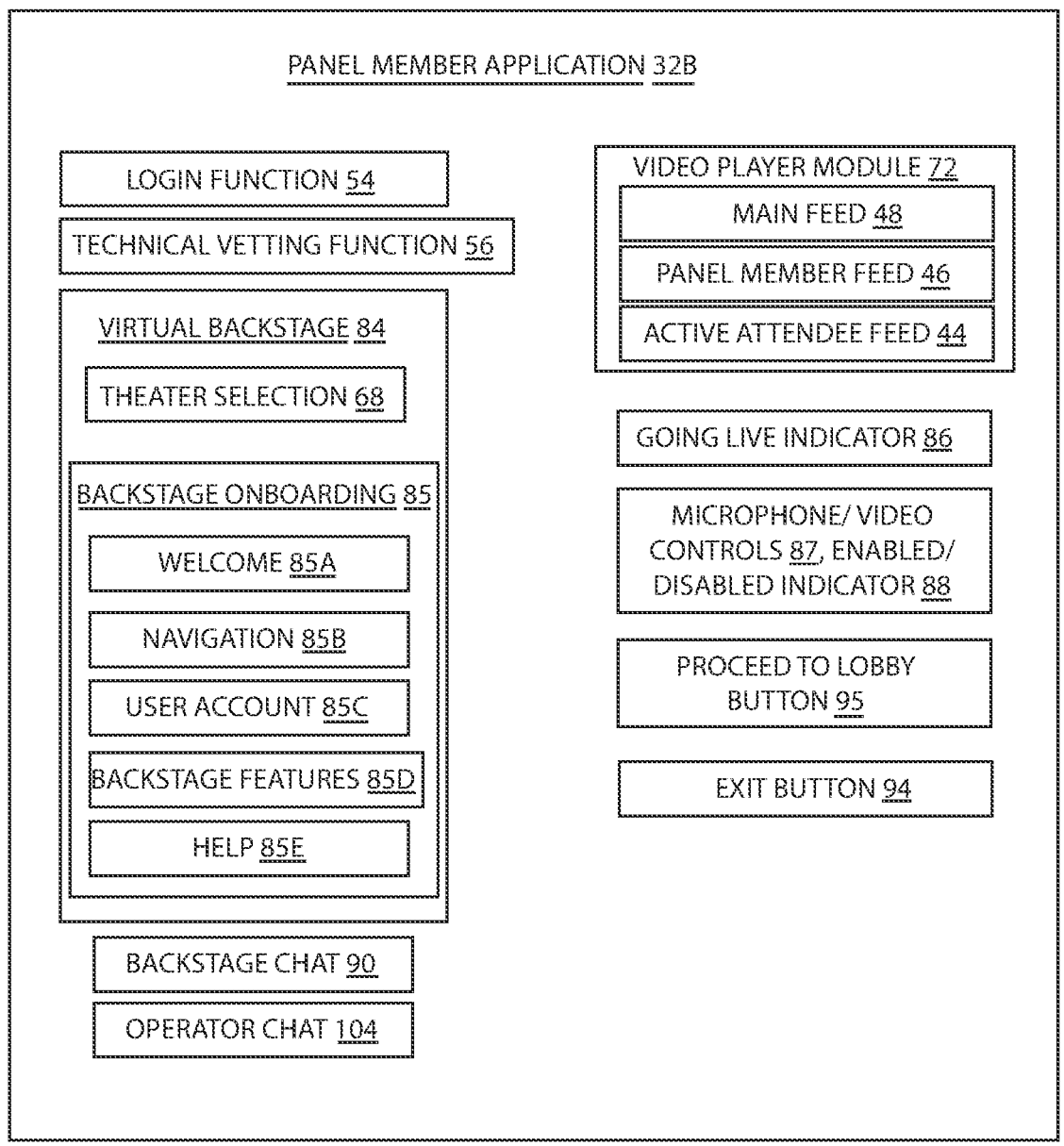
FIG. 2E is an exemplary block diagram depicting the features of the panel member application.

With reference to FIGS. 1-2D, and with particular reference to FIG. 2E, an exemplary block diagram depicting the features of the panel member application 32B is shown. Panel members 34 are the "talent." i.e. high profile individuals of interest to the general public such as actors, sports figures and politicians, among others.

The panel application 28B contains the login function 54, technical vetting function 56, virtual backstage 84, video player 72, backstage chat 90, a going live indicator 86, a microphone and video controls enabled/disabled (status) indicator 88, a proceed to lobby button 95 and an exit button 94. The login function 54, technical vetting function 56, the virtual backstage 84 and backstage chat 90 components of the panel member's application 32 are the same as those of the vetting manager application 20B, queue manager application 24B and stage manager application 28B and operate similarly.

The video player 72 of the panel member application 32B, provides the panel member with the main video feed 48. The going live indicator 86 is an indicator that informs the panel member 34 that it is time to begin the live event 11. The microphone and video controls status indicator 88 indicates to the panel member when these controls are enabled or disabled during an event. While a panel member 34 is live, the panel member application 32B limits the backstage chat function 90 to a text only mode.

After completing their events, panel members 34 may enter the virtual lobby 66 where they can use the lobby chat function 70 to interact with attendees 18 the panel members may or exit the event presentation system 10 via an exit button 94.

Server Application 12B

Figure 2F:
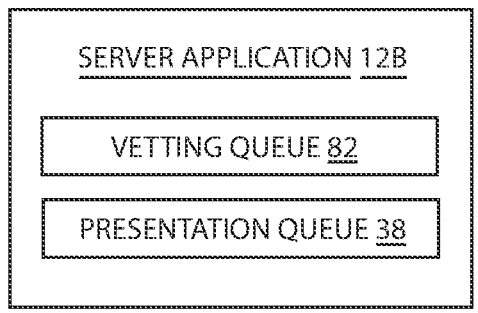
FIG. 2F is an exemplary block diagram depicting selected features of the server application.

With reference to FIG. 2F, the server application 12B maintains the vetting queue 82 and the presentation queue 38.

Overall System and Attendee Process Flow

Figure 3A:
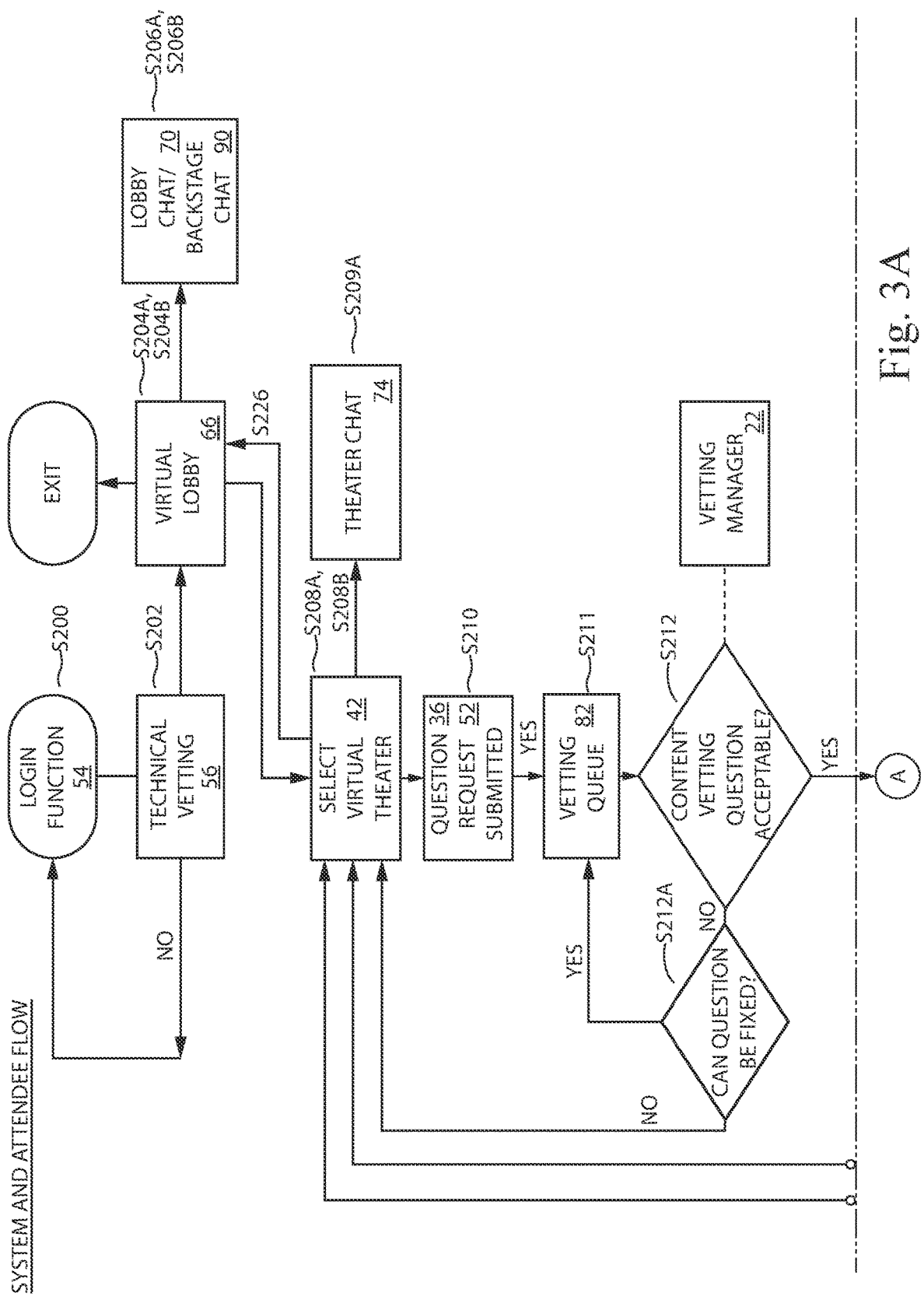
FIG. 3A is a flow chart depicting an overall process flow for the online system of the present invention and in particular the process flow for attendees.

With reference to FIGS. 1-2E and with particular reference to FIGS. 3A and 3B, an exemplary flow process for implementing the event presentation system 10, and in particular, the attendee flow process, is presented. In step S200, system users 62, i.e. attendees 18, the vetting manager 22, queue manager 26, stage manager 30 and panel members 34, log on to the event presentation system 10, i.e. access the system server 12A on which resides the system application 12B, using their respective computing devices 16A, 20A, 24A, 28A and 32A on which reside, respectively, applications 16B, 20B, 24B, 28B and 32B.

Logging in is accomplished by the login function 52 which is common to each of the user applications (16B, 20B, 24B, 28B and 32B). The system users 62 are not required to access the event presentation system 10 at the same time. However, typically, the operator users 64 and panel members 34 and at least some attendees 18 will have accessed the system prior to the start of an event 11.

In step S202, after logging in, each of the system users 62 complete technical vetting which verifies the proper operation of the microphone and video camera of each system user's computing device. Technical vetting is accomplished by the vetting function 56 which is common to each of the user applications (16B, 20B, 24B, 28B and 32B). Functional microphones, video cameras, displays and keyboards are required for all system users 62, with the exception of attendees who desire to merely watch an event, in which case functional microphones and video cameras are not required.

In step S204, once each attendee 18 has passed through technical vetting, the attendee 18, using the attendee application 16B, enters the virtual lobby 66 having one or more virtual theaters 42, where in each virtual theater 42 an event 11 is either in the process of being streamed on the composite video feed 48 or will be streamed at a designated time. While in the virtual lobby 66, attendees 18 are familiarized with features of the event presentation system 10 including how to use the virtual lobby 66 and enter and use the virtual theaters 42.

In optional step 206A, each attendee 18 in the virtual lobby 66 may engage in chat with other attendees in the virtual lobby 66 using the lobby chat function 70.

In step S208, each attendee 18, having entered the virtual lobby 66, via their attendee application 16B, selects the virtual theater 42 that will show or is showing, the event 11 they desire to see. Upon selection of a particular virtual theater 42, each attendee 18 is automatically entered into the theater 42, wherein the composite main or composite video feed 48 for the selected theater 42 appears on the display screen of their attendee computing device 16A.

In optional step S209, each attendee 18 in the virtual theater 42 may engage in chat with other attendees in the virtual theater 42 using the theater chat function 74.

In step 210, an attendee 18, using the attendee application 16B, may submit a question request 52 to present a question 36 to one or more panel members 34. Upon the submission of a question request 52, the attendee 18 submitting the request is placed by the event presentation system 10 in the vetting queue 82.

In step 212, the vetting manager 22, using the vetting manager application 20B, opens a video chat with each attendee 18 who submitted a question request 52 and interviews the attendee regarding the attendee's question 36 to be presented. If the question 36 meets specific subject matter content criteria, the vetting manager approves the question 36 via the approval function 108.

If the question to be presented is denied by the vetting manager 22, in step S212A, the vetting manager 22 determines whether the particular question 36 to be presented can by revised so as to be acceptable, i.e. can the question to be presented be fixed. If the particular question 36 to be presented can be revised, the particular attendee 18 is returned to the vetting queue 82, via the deny function 110, where the attendee may revise the content of his or her question 36 to be presented. In certain instances, the vetting manager 22 may deem that the particular question 36 to be presented is not fixable, i.e. is directed to unacceptable subject matter. In such situations, the particular attendee is returned to the virtual theater 42 by means of the vetting manager activating the cancel function 112.

In step S214, upon the approval of an attendee's question 36 to be presented, the event presentation system 10 designates the particular attendee 18 a participant-attendee 18A and places the participant-attendee 18A in the presentation queue 38. The specific criteria for acceptable question content may vary from event to event depending upon event subject matter.

In optional step S216, after the event presentation system 10 has placed a participant-attendee 18A in the presentation queue 38, the queue manager 26 may adjust the order of each participant-attendee 18A in the presentation queue 38 or remove participant-attendee's from the presentation queue. While in the presentation queue 38, participant-attendees 18A remain able to watch the event 11 presented in the virtual theater 42.

As the presentation queue 38 progresses, each participant-attendee 18A becomes the next-in-line-to-go-live attendee 18B, i.e. the next participant-attendee to be presented live to the panel members 34. In step S218, prior to being presented to the panel members 34, the stage manager 30 queries the next-in-line-to-go-live attendee 18B to determine whether he or she still desires to present his or her question 36 to the panel members 34.

As participant-attendees 18A wait their turn in the presentation queue 38, before presenting their particular question 36 to be presented, it is possible that a previous participant-attendee may have asked the same question, or the subject matter of the next-in-line participant-attendee's question 36 may have otherwise been addressed by the panel members 34. In such instances, the next-in-line participant-attendee 18B may elect not to present their question, in which case the participant-attendee 18B is redesignated an attendee 18 and removed by the event presentation system 10 from the presentation queue 38 and returned to the virtual theater 42.

In step S220, when a next-in-line-to-go-live attendee 18B is ready to go live, the stage manager 30, using the stage manager's application 28B, designates or stages the next-in-line-to-go-live attendee 18B on the event presentation system 10 as the active attendee 18C.

In step S222, the stage manager 30 takes the active attendee 18C live by opening a video chat function between the active attendee 18C and the panel members 34, after which the active-attendee 18C presents his or her question live to the panel members 34 and engages in a question and answer session 50 with the panel members. During step S222, the stage manager 30 composites the active attendee's video feed 44 with the video feed 46 of the panel members 34 to create the main or composited video feed 48 which is displayed in the virtual theater 42, i.e. both video feeds are displayed simultaneously in the virtual theater 42.

In step S224, when the live question and answer session 50 concludes, the stage manager 30 redesignates the active attendee 18C as an attendee 18 and removes or decomposites the formerly active attendee's video feed from the composite video feed 48 displayed in the virtual theater 42 and returns the formerly active attendee to the virtual theater 42, where the attendee may watch the rest of the event 11 and may submit a new question request 52 to present a new question 36 to be presented to the panel members 34.

At all times during operation of the event presentation system 10 of the present invention, the operator users 64, i.e. the vetting manager 22, queue manager 26 and stage manager 30, are able to communicate with each other via an operator chat function 104. The panel members 34 are able to engage in chat with each other and the operator users 64 via a back stage chat function 90.

Upon the conclusion of an event, in step S226, attendees 18 are returned to the virtual lobby 66 from where they may elect to enter another theater 42 hosting another event or exit the event presentation system 10.

Vetting Manager Process Flow

Figure 4:
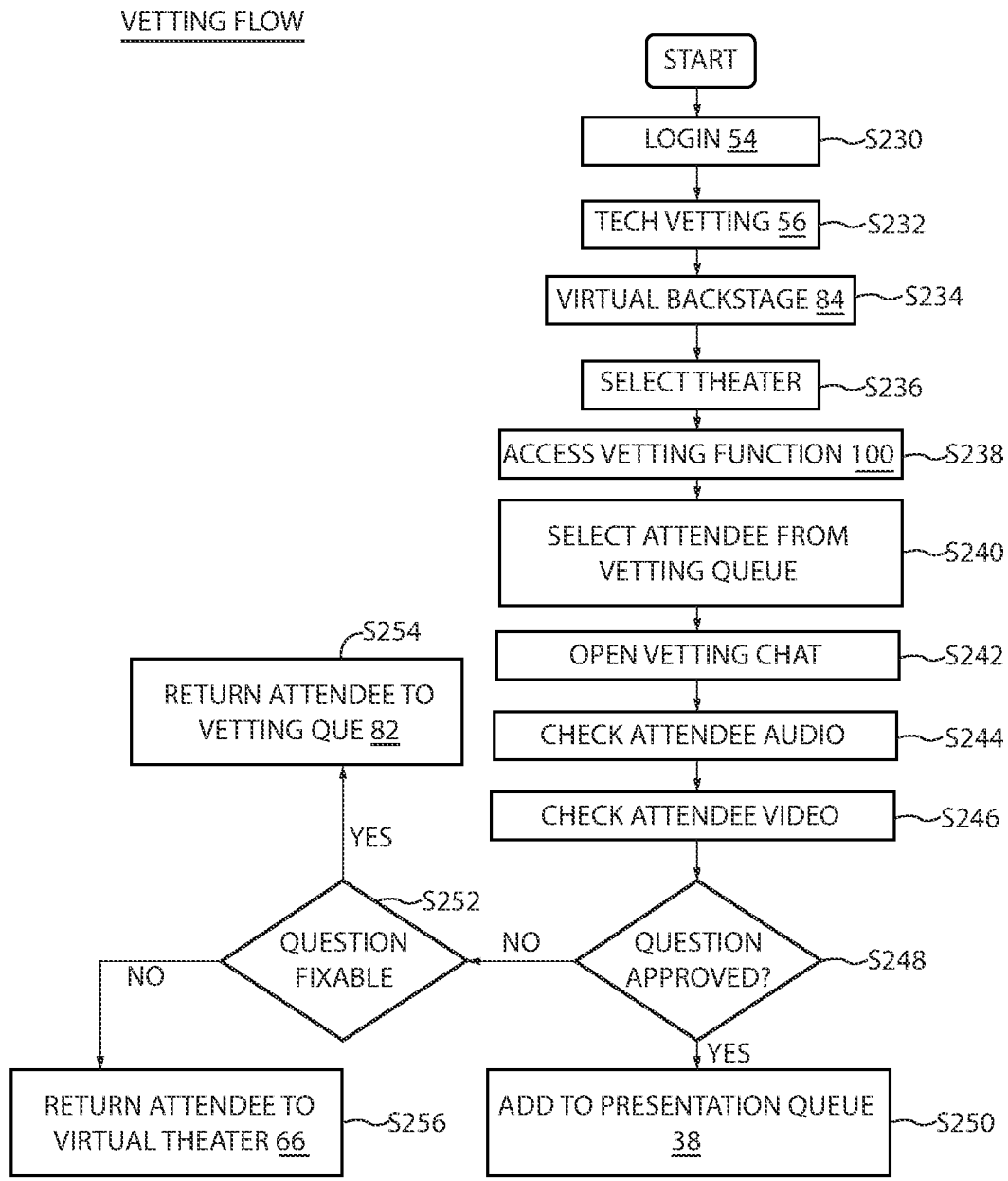
FIG. 4 is a flow chart depicting the process flow for the vetting manager application.

With reference to FIGS. 1-3B, and with particular reference to FIG. 4, an exemplary flow process for the vetting manager 22 is presented. In step S230, the vetting manager 22 executes the login function 54 and in step S232 completes the technical vetting function 56. In step S234, the vetting manager enters the virtual backstage 84, where the vetting manager may, if desired, familiarize himself or herself with how to navigate and use the features of the virtual backstage and the vetting manager application 20B.

Thereafter, in step S236, the vetting manager chooses the virtual theater 42 that he is assigned to, and, in step S238, accesses the vetting function 100. In step S240, the vetting manager selects an attendee 18 from the vetting queue 82 and, in step S242, opens vetting chat 78 with the attendee. In step S244, the vetting manager checks the attendees audio quality and in step S246, checks the attendee's video quality.

In step S248, the vetting manager either approves or denies that attendee's question 36. If the question 36 is approved, the attendee is placed in the presentation queue 38, in step S250. If the question is denied, in step S252, the vetting manager determines where the question 36 is fixable. If the question is fixable, the attendee is returned to the vetting queue 82 in step S254. If the question is not fixable, in step 256, the attendee is returned to the virtual theater 66.

Queue Manager Process Flow

Figure 5:
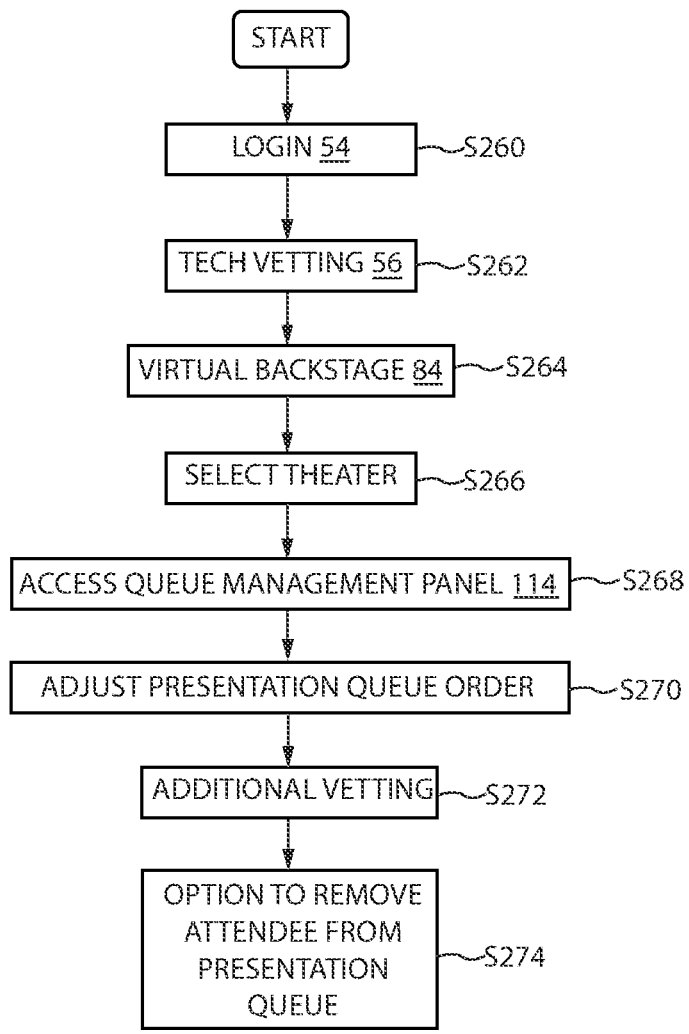
FIG. 5 is a flow chart depicting the process flow for the queue manager.

With reference to FIGS. 1-4, and with particular reference to FIG. 5, an exemplary flow process for the queue manager 26 is presented. In step S260, the queue manager 26 executes the login function 54 and in step S262 completes the technical vetting function 56. In step S264, the queue manager enters the virtual backstage 84, where the queue manager may, if desired, familiarize himself or herself with how to navigate and use the features of the virtual backstage and the queue manager application 24B. Thereafter, in step S266, the queue manager selects the virtual theater 42 that he is assigned to, and, in step S268, accesses the queue management panel 114. In step S270, the queue manager may adjust the order of the attendees 18 in the presentation queue 38 and may advance any attendee to the next-in-line-to-go-live position in the presentation queue 38. In step S272, the queue manager may, optionally, conduct additional vetting of attendees or may conduct vetting in place of the vetting manager, if necessary. In step S274, the queue manager, may, at his discretion, remove any attendee 18 from the presentation queue 38.

Stage Manager Process Flow

Figure 6:
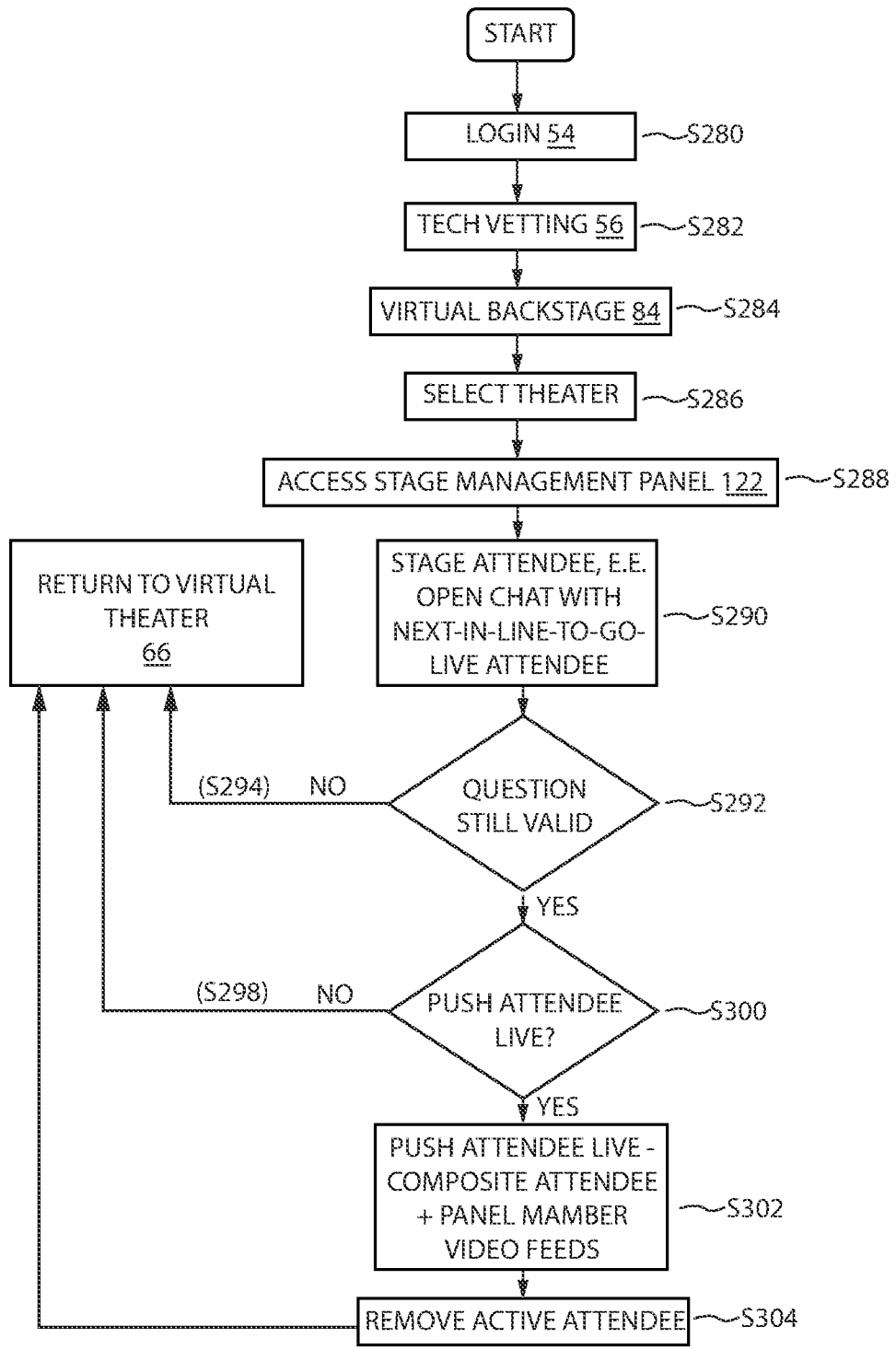
FIG. 6 is a flow chart depicting the process flow for the stage manager.

With reference to FIGS. 1-5, and with particular reference to FIG. 6, an exemplary flow process for the stage manager 30 is presented. In step S280, the stage manager 30 executes the login function 54 and in step S282 completes the technical vetting function 56. In step S284, the stage manager enters the virtual backstage 84, where the stage manager may, if desired, familiarize himself or herself with how to navigate and use the features of the virtual backstage 84 and the stage manager application 28B.

Thereafter, in step S286, the stage manager 30 chooses the virtual theater 42 that he is assigned to, and, in step S288, accesses the stage management panel 288 of stage manager application. In step S290, the stage manager stages the next-in-line-attendee-to-go live 18B, i.e. the stage manager opens a two way video chat with the attendee 18B. In step S292, the stage manager queries the attendee 18B as to whether they still desire to ask their question 36. If the answer is no, the attendee is returned the virtual theater 66 in step S294. If the answer is yes, in step S302, the stage manager 30 pushes the attendee 18B live, designates the attendee as the active attendee 18C, and composites the active attendee's video feed 44 with that of the panel members 34 to produce the main video feed 48. In step S304, upon completion of the question and answer session 50 between the active attendee 18C and the panel members 34, the stage manager 30 decomposites the active attendee's video feed 44 from the main feed 48 and returns the now formerly active attendee to the virtual theater 42.

Panel Member Process Flow Substeps

Figure 7:
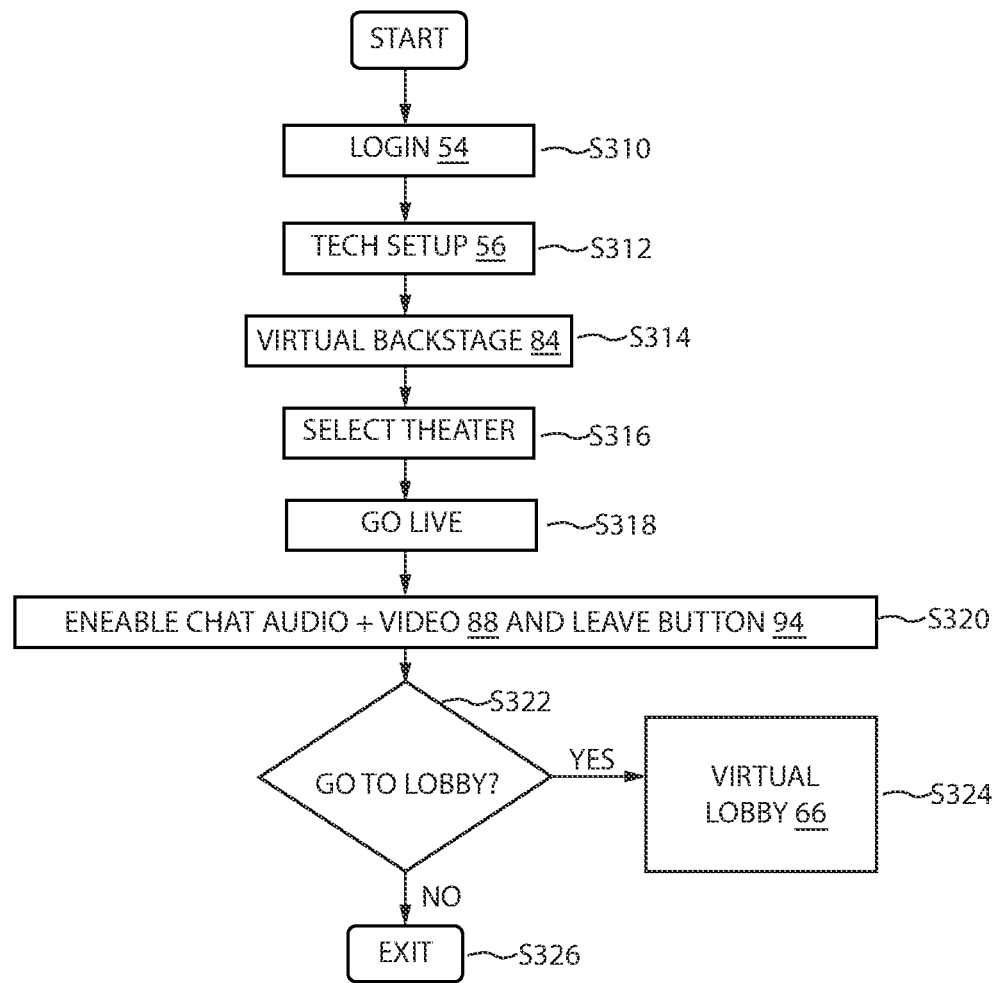
FIG. 7 is a flow chart depicting the process flow for panel member(s).

With reference to FIGS. 1-6, and with particular reference to FIG. 7, an exemplary flow process for the panel member 34 is presented. In step S310, a panel member 34, logs on to the event presentation system 10 using his or her computing device 32A on which resides the panel member application 32B. Logging in is accomplished by the login function 54.

In step S312, after logging in, the panel member completes technical vetting which verifies the proper operation of the camera and microphone, display of the panel member computing device 32A. Technical vetting is accomplished by the vetting function 56.

In step S344, once the panel member 34 has passed through technical vetting, the panel member enters the virtual backstage 84, which provides access to one or more virtual theaters 42.

While in the virtual backstage 84, the panel member 34 may access a backstage onboarding module 85, where he or she may familiarize himself or herself with the features of the panel member application 32B.

In step S316, the panel member 34 selects virtual theater 66 for the event where he or she will participate.

In step, S318, upon activation of the going live indicator 86, the panel member 34 engages in a question and answer session 50 with the active attendee 18C, i.e. the panel member 34 via video chat responds to a questions 36 from the active attendee 18C. The panel member's microphone and video controls 87 are disabled in this step.

In step S320, upon conclusion of the live event 11, the panel member's audio and video controls 87 are enabled, a exit button 94 is enabled.

In step S322, the system queries the panel member 34 as to whether he or she desires to either proceed to the virtual lobby 66, where the panel member 34 would be free to chat with attendees or leave the system. If the answer is yes, in step 324, panel member returns to the virtual lobby 66. If the answer is no, in step S326, the panel member exits the system.

In accordance with the description herein, suitable computing devices include, by way of non-limiting examples, server computers, desktop computers, laptop computers, notebook computers, netbook computers, smartphones and tablet computers, among others. Those of skill in the art will also recognize that select televisions and video game consoles with computer network connectivity are suitable for use in the system described herein.

As used herein, a software application is a computer program that includes a sequence of instructions, executable on digital processing devices, written to perform a specified task. Computer readable instructions may be implemented as program modules, such as functions, objects, application programming interfaces, data structures, and the like, that perform particular tasks or implement particular data types. In light of the disclosure provided herein, those of skill in the art will recognize that a computer program may be written in various versions of various languages.

As used herein an operating system is, for example, software, including programs and data, which manage a computing device's hardware and provide services for the execution of software applications. Those of skill in the art will recognize that suitable server operating systems include, by way of nonlimiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

As referred to herein, a memory device is one or more physical devices used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical.

For example, the exemplary embodiment of the event presentation system 10 utilizes three system operators. i.e. the vetting manager 22, queue manager 26 and stage manager 30. Depending upon the size and nature of an event and/or improvements in automation, a single system operator may perform the functions of the vetting, queue and stage managers described herein. Likewise, certain functions such as the technical and content functions described herein may be conducted as either individual functions or steps or may be combined into a single step. For example, technical vetting may be an automated function while question content vetting is conducted by a human operator. Alternatively, both technical and question content vetting may be conducted by a human operator. Further, improvements in artificial intelligence may allow both technical vetting and question content vetting to be automated functions. It is intended that the claims cover all such modifications and alternative embodiments.

The invention claimed is:

1. A system for sharing events over a network, comprising:
   a plurality of audience member computing devices, a speaker computing device, an operator computing device, and a system server computing device, interconnected by a network;

the plurality of audience member computing devices each configured to execute an audience member software application;

wherein each audience member software application is configured to receive and transmit audio-visual feeds;

wherein each audience member software application is configured to allow an audience member to submit a request to present a question to a speaker;

the speaker computing device configured to execute a speaker software application;

wherein the speaker software application is configured to receive and transmit audio-visual feeds;

the system server computing device configured to execute a system software application;

wherein the system server software application is configured to create a vetting queue, the vetting queue comprising each audience member who submits a request to present a question;

wherein the system server software application is configured to create a presentation queue, the presentation queue comprising each audience member whose question is determined to be acceptable by an operator;

wherein the system software application is configured to make the vetting queue and the presentation queue accessible to an operator software application;

the operator computing device configured to execute an operator software application;

wherein the operator software application is configured to receive and transmit audio-visual feeds;

wherein the operator software application is configured to allow the operator to select from the vetting queue each audience member and open communications to determine whether each audience member's question is acceptable, unacceptable but fixable or unacceptable and not fixable;

wherein, if the operator-determines that an audience member's question is acceptable, the operator software application is configured to place that audience member in the presentation queue;

wherein, if the operator determines that an audience member's question is unacceptable but fixable, the operator software application is configured to return that audience member to the vetting queue; and wherein, if the at least one operator determines that an audience member's question is unacceptable and not fixable, the at least one operator software application removes that audience member from the vetting queue.

2. The system of claim 1 wherein the system is configured to allow the operator to open a chat session with an audience member who submitted an unacceptable question to modify the question.

3. The system of claim 1, wherein the system is configured to allow the operator to determine if a question of an audience member in the first queue is unacceptable but fixable, and is configured to provide the audience member with the an unacceptable but fixable question with an opportunity to fix the question.

4. The system of claim 1 wherein the operator computing device is configured to allow the operator to selectively advance an audience member ahead of at least one other audience member in the presentation queue.

5. The system of claim 1 wherein the operator computing device is configured to allow the operator to communicate with an audience member in the vetting queue who submitted an unacceptable question to modify the unacceptable question to an acceptable question.

6. The system of claim 5 wherein the operator computing device is configured to move the audience member having the question modified to be an acceptable question into the vetting queue.

7. The system of claim 1 wherein the operator computing device is adapted to receive the audio-visual feed from the speaker computing device.

8. The system of claim 1 wherein the operator computing system is adapted to receive questions for the speaker from at least one audience member from an audience member computing system.

9. The system of claim 1 wherein the operator computing device allows the operator to move a selected audience member in the presentation queue to the top of the presentation queue.

10. The system of claim 1 comprising a virtual theatre, wherein the operator computing device system is configured configure to vette audience members and allow the vetted audience members access to the virtual theatre.

11. The system of claim 1, wherein the audio-visual feed from the speaker is composited to include an audio-visual feed from an active audience member during the time active audience member is engaged in a video chat session with the speaker.

* * * * *